United States Patent
Yamamoto (10) Patent No.: US 6,445,373 B1
(45) Date of Patent: Sep. 3, 2002

(54) DISPLAY APPARATUS

(75) Inventor: Koichi Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/392,556

(22) Filed: Sep. 9, 1999

(30) Foreign Application Priority Data

Sep. 10, 1998 (JP) .......................................... 10-256381

(51) Int. Cl.[7] .............................................. G09F 13/04
(52) U.S. Cl. ......................................... 345/102; 40/564
(58) Field of Search .............................. 359/50, 83, 48, 359/42, 88; 40/572, 575, 564; 345/102

(56) References Cited

U.S. PATENT DOCUMENTS

| | | | | |
|---|---|---|---|---|
| 1,668,378 A | * | 5/1928 | Pickett | |
| 1,847,775 A | * | 3/1932 | Manfre | |
| 1,857,882 A | * | 5/1932 | Shipman | |
| 3,877,165 A | * | 4/1975 | Lumbard | 40/152 |
| 4,848,875 A | | 7/1989 | Baughman et al. | 350/331 |
| 4,903,423 A | * | 2/1990 | Hinca | 40/205 |
| 5,126,632 A | * | 6/1992 | Parker | 313/634 |
| 5,432,626 A | | 7/1995 | Sasuga et al. | 359/83 |
| 5,442,470 A | | 8/1995 | Hashimoto | 359/83 |
| 5,665,938 A | * | 9/1997 | Boshear et al. | 174/50 |
| 5,819,454 A | * | 10/1998 | Rosenitsch | 40/524 |
| 6,069,596 A | * | 5/2000 | Marvin et al. | 345/52 |
| 6,131,748 A | * | 10/2000 | Kawasaki et al. | 211/54 |
| 6,169,632 B1 | * | 1/2001 | Kurtenbach et al. | 359/621 |
| 6,189,594 B1 | * | 2/2001 | Carter | 160/135 |

FOREIGN PATENT DOCUMENTS

| | | | | |
|---|---|---|---|---|
| GB | 2 201 280 | | 8/1988 | |
| JP | 04288526 | * | 10/1992 | G02F/1/1335 |

* cited by examiner

Primary Examiner—Vijay Shankar
Assistant Examiner—Nitin Patel
(74) Attorney, Agent, or Firm—Sonnenschein, Nath & Rosenthal (57) ABSTRACT

The invention provides a display apparatus which employs a display panel to display an image and has a large screen with a light weight and a sufficient structural strength and besides allows easy replacement of a light source of a lighting apparatus. The display apparatus includes a display panel, a circuit board, a light source unit and an optical panel all mounted on a rectangular frame formed from a combination of extruded members such as polygonal steel tubes. The frame serves also as an armor for the lighting apparatus, and this decreases the weight of the display apparatus. A light source of the light source unit can be replaced by taking out only the light source unit from the display apparatus.

14 Claims, 8 Drawing Sheets

DISPLAY APPARATUS

RELATED APPLICATION DATA

The present application claims priority to Japanese Application No. P10-256381 filed Sep. 10, 1998 which application is incorporated herein by reference to the extent permitted by law.

BACKGROUND OF THE INVENTION

1. Field of the Invention

This invention relates to a display apparatus, and more particularly to a display apparatus which employs a display panel to display an image.

2. Description of the Prior Art

Figure 1:
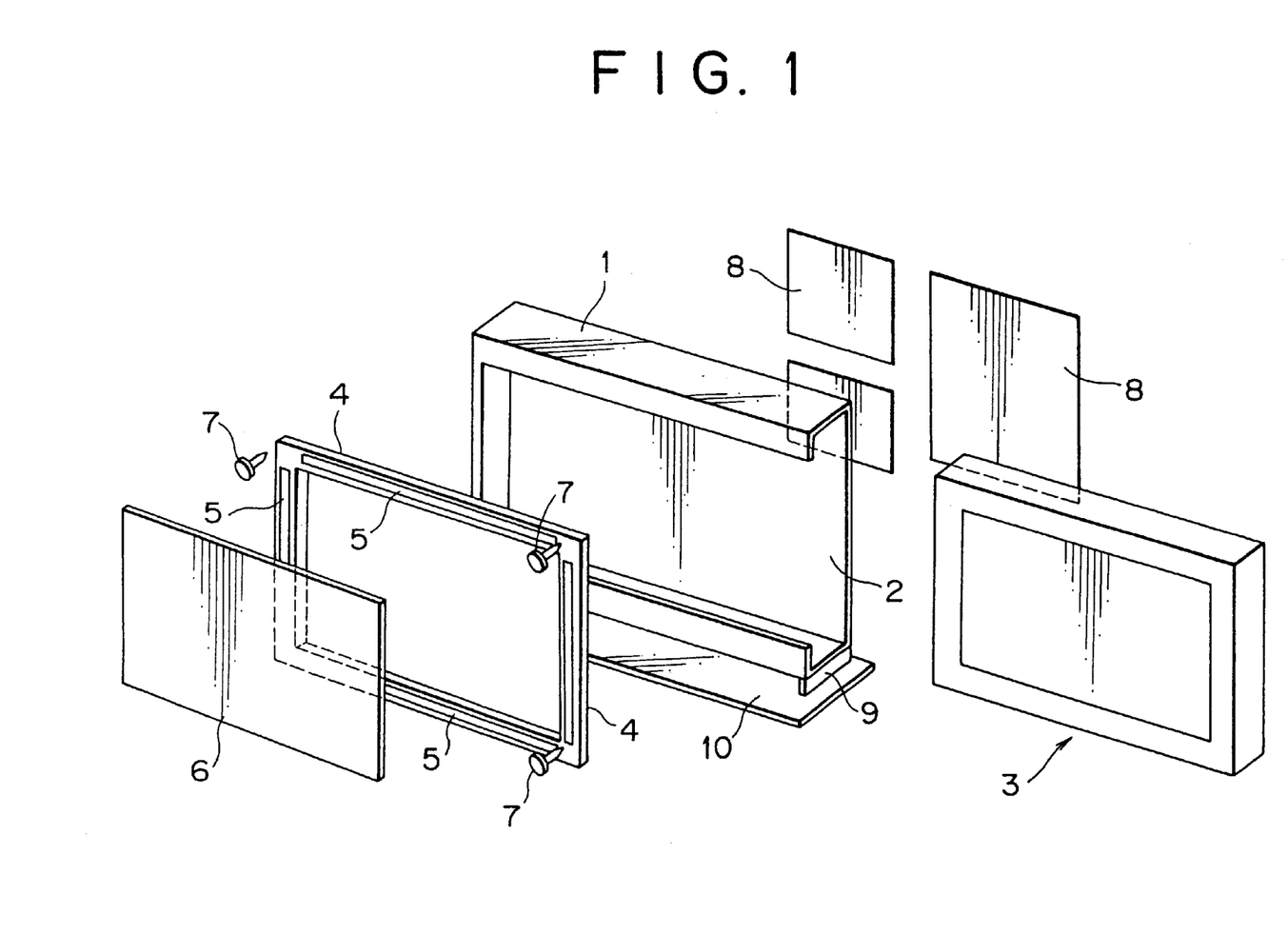
FIG. 1 is an exploded perspective view showing a structure of a conventional display apparatus.

FIG. 1 shows a conventional display apparatus which employs a display panel for which a liquid crystal display panel is used. The display apparatus includes a chassis 1. The chassis 1 is formed by bending a sheet metal of an aluminum alloy. The chassis 1 is open on the front side and has a side face opening 2 formed on the right-hand side face such that a box-shaped lighting apparatus 3 in the form of a unit can be inserted into the chassis 1 through the side face opening 2. The opening on the front side of the chassis 1 allows light from the lighting apparatus 3 to go out forwardly therethrough. The lighting apparatus 3 is used as a backlight. Usually, a side edge backlight type apparatus or a direct backlight type apparatus is used for the lighting apparatus 3.

A panel holder 4 is combined on the front face side of the chassis 1. The panel holder 4 is formed from a frame member which supports a liquid crystal panel 6 thereon. The liquid crystal panel 6 is adhered to the panel holder 4 with a double-sided adhesive tape 5 and is attached to the front face of the chassis 1 together with the panel holder 4 by means of screws 7.

A circuit board 8 of the display apparatus is mounted on the rear face side of the chassis 1. The chassis 1 has a pair of short legs 9 provided on the opposite sides of a lower portion thereof and is supported on a support base 10 through the legs 9.

Figure 2:
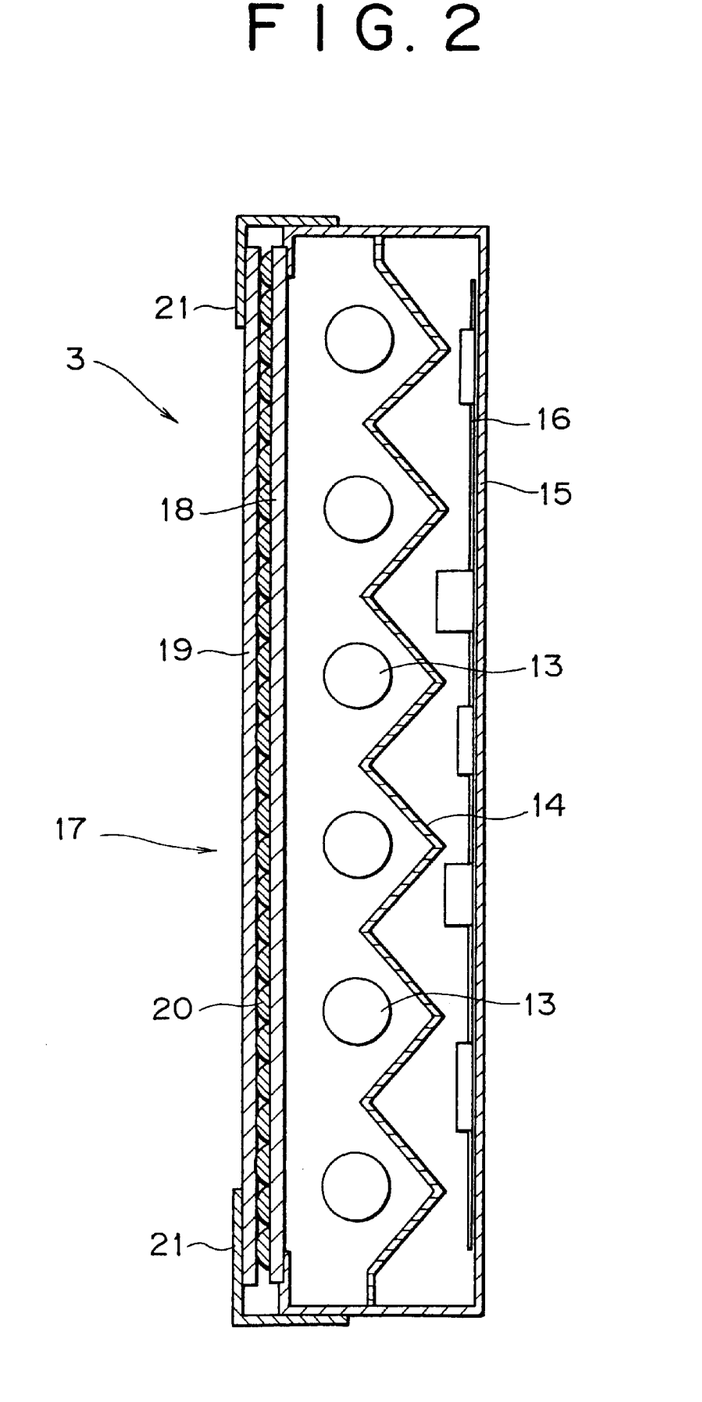
FIG. 2 is a vertical sectional view of a lighting apparatus employed in a conventional display apparatus.

The lighting apparatus 3 in the form of a unit accommodated in the chassis 1 is described below with reference to FIG. 2. The lighting apparatus 3 shown in FIG. 2 is of the direct backlight type and includes a plurality of fluorescent lamps 13 disposed in a juxtaposed relationship with each other and serving as light sources. A reflecting plate 14 is disposed on the rear face side of the fluorescent lamps 13, and a circuit board 16 for energizing the fluorescent lamps 13 is disposed on the rear side of the reflecting plate 14. The circuit board 16 is mounted on a casing 15.

An optical panel 17 for eliminating non-uniformity of the luminance is mounted on the front face of the lighting apparatus 3.

The optical panel 17 includes a combination of three members of a rear face side diffusion plate 18, a prism sheet 20 and a diffusion plate 19.

The rear face side diffusion plate 18 is used to diffuse the light to reduce non-uniformity of the luminance. This is because the location in front of each of the fluorescent lamps 13 is liable to be brighter than any other location.

The prism sheet 20 is disposed on the rear face side diffusion plate 18. The prism sheet 20 is provided to condense the light of the fluorescent lamps 13 on the front to augment the luminance on the front.

The diffusion plate 19 is disposed on the prism sheet 20. The diffusion plate 19 prevents a moire which is caused by the combination of the prism sheet 20 and the liquid crystal panel 6.

The optical panel 17 is attached to the casing 15 by means of a pair of holding members 21.

When the lighting apparatus 3 is incorporated in the chassis 1 of the display apparatus having the structure described above with reference to FIG. 1, the chassis 1 surrounds the lighting apparatus 3. Consequently, the display apparatus has a dual box structure including the chassis 1 and an armor formed from the casing 15 of the lighting apparatus 3. Accordingly, application of the structure to a display apparatus of a large screen gives rise to a problem that the display apparatus becomes heavy in weight. Further, when the lighting apparatus 3 is taken out of the chassis 1, the strength of the chassis 1 against torsion becomes very low. Therefore, the display apparatus is disadvantageous in that, if an unnecessary force acts upon the chassis 1 while the lighting apparatus 3 is not accommodated in the chassis 1 such as, for example, upon assembly of the display apparatus, the chassis 1 is distorted or the lighting apparatus 3 becomes less liable to be inserted into the chassis 1.

Further, with the display apparatus shown in FIG. 1, when the lighting apparatus 3 is inserted into or removed from the chassis 1, the optical panel 17 shown in FIG. 2 is sometimes damaged or soiled. In order to prevent non-uniform luminance caused by such damage or soil from appearing conspicuously, it is necessary to attach a thin diffusion plate to the back face side of the liquid crystal panel 6. The panel holder 4 of FIG. 1 is provided to this end. If the panel holder 4 is omitted in order to reduce the weight of the set, then a thin diffusion plate for prevention of non-uniform luminance cannot be attached and therefore the liquid crystal panel 6 is attached directly to the chassis 1 by means of the double-sided adhesive tape 5. The structure just described, however, has a problem in that non-uniform brightness originating from damage or soil to the optical panel is not reduced and an undesirable stress is applied to the liquid crystal panel 6 by a distortion of the chassis 1.

Some of display apparatus which employ, for example, a small-size liquid crystal panel of 14 inches or less employ a lighting apparatus in the form of a unit as a chassis. More particularly, a liquid crystal display panel is attached directly to the front face of a lighting apparatus, and a circuit board is mounted on the rear face of the lighting apparatus. The structure is superior in that it allows realization of reduction in weight and miniaturization of a display apparatus. However, it is disadvantageous in that time is required for replacement of a light source of the lighting apparatus.

SUMMARY OF THE INVENTION

It is an object of the present invention to provide a display apparatus which has a large screen with a light weight and a sufficient structural strength and allows easy replacement of a light source of a lighting apparatus.

In order to attain the object described above, according to an aspect of the present invention, there is provided a display apparatus including a display panel for displaying an image thereon, including a rectangular frame formed from a combination of bar members corresponding to four sides of the display panel, and a circuit board for driving the display panel mounted on the frame together with the display panel.

With the display apparatus, since the frame serves also as a chassis and besides has a rectangular shape composed of a combination of bar members corresponding to the four sides of the rectangle, a sufficient strength is assured.

The display apparatus may be constructed such that each of the bar members which form the frame is a polygonal tube-like member, and the polygonal tube-like member of at least one of the bar members has a groove for holding a part or a unit of the display apparatus. Further, the display apparatus may be constructed such that the bar member is formed from a molded member, and the groove is formed in the molding direction. The frame may support a light source unit of the display panel and serves also as a casing for the light source unit. The light source unit may include a plurality of linear light sources mounted on a reflecting plate and is removably mounted on the frame. The display apparatus may be constructed such that an opening is formed in the bar member of one of the four sides of the frame and a guide groove is formed on each of a pair of the bar members on the opposite sides of the one side with the opening, and a part or a unit of the display apparatus is inserted into the frame through the opening and held by the guide grooves.

According to another aspect of the present invention, there is provided a display apparatus, comprising a rectangular frame, a display panel attached to the front face side of the frame, and a light source unit including a light source, a reflecting plate and an optical panel, the light source unit being accommodated in and held by the frame.

With the display apparatus, the display panel, light source unit and optical panel can be mounted on the rectangular frame to assembly the display apparatus. Consequently, the display apparatus is simple in structure and is composed of a comparatively small number of parts.

The light source unit may be inserted into the frame through an opening of the frame and held by grooves on the inner side of the frame. Alternatively, the light source unit may be inserted into the frame through an opening on the rear face side of the frame.

In a preferred form of the present invention, a panel type display apparatus includes a frame which is composed of a rectangular framework composed of a combination of four bar members and serves also as a chassis to which a display panel, a circuit board and other components are attached. For the members of the chassis of the frame structure type, extruded or drawn members are used. The members may be groove steel bars or polygonal steel pipes on which grooves extending in the extruding or drawing direction can be formed readily and which is light in weight and high in bending strength, and grooves for holding a light source unit or an optical panel are preferably formed on the members upon molding.

By attaching a light source to the rear face of the chassis of the frame structure and attaching the optical panel to the front face of the chassis, the chassis of the frame structure can be used as a casing for the lighting apparatus, and optical parts such as the light source, a reflecting plate and a diffusion plate, a circuit board and so forth can be attached in units of a part or as a unit to the chassis of the frame structure. In particular, when compared with a conventional structure of a display apparatus wherein a lighting apparatus covered with a box-shaped casing is mounted on a chassis, in the lighting apparatus of the present invention, the chassis serves also as a casing for the lighting apparatus. Accordingly, the weight of the display apparatus can be reduced. Preferably, in order to facilitate assemblage of the display apparatus, a fluorescent lamp serving as the light source is attached to the reflecting plate to form an integrated light source unit.

Further, where an opening is provided on one of a side face, an upper face and a lower face of the chassis of the frame structure, the light source unit wherein the light source is attached to the reflecting plate and the optical panel are inserted into and removed from the chassis through the opening and also they are slidably moved along guide grooves provided on the chassis of the frame structure, replacement of the light source can be performed with more simply.

A significant characteristic of the display apparatus having the construction described above resides in that reduction in weight of the set can be achieved particularly where a display panel of a large size is employed and reduction in cost of the set chassis and the lighting apparatus can be achieved and besides simplicity in replacement of the light source is achieved.

A large-screen plasma display unit or a like unit is in a situation far from being called wall-mounted display unit in terms of the luminance, weight and so forth. In particular, a plasma display unit of the 42-inch size has a weight of 50 to 70 kg. In contrast, a display apparatus to which the present invention is applied can be produced with a set weight of 30 to 40 kg.

This is described more specifically. A display apparatus which employs a conventional display panel in almost all cases employs a liquid crystal panel of an approximately 14-inch size and is small in size. However, a plasma-addressed liquid crystal panel has been developed in recent years, and a large-size liquid crystal display apparatus of a 40-inch size or more are being developed. The present invention is directed to a structure suitable for a display apparatus which includes a large-size lighting apparatus and is fundamentally different in concept of the structure from conventional small-size display apparatus. In particular, a chassis of a conventional display apparatus is formed by bending a sheet metal. The reason why a chassis of the type is used is that, since it is small in size, a sufficient strength can be assured and an intended accuracy in dimension can be obtained even with a sheet metal and the cost is low.

However, if the chassis structure of a sheet metal is applied as it is to a display apparatus of a large screen, for example, of a screen of 40-inch or more size, then this gives rise to a disadvantage that a resulting chassis lacks in strength and is low in accuracy in dimension. Further, since metal dies are required for working of a sheet metal, metal dies of large sizes are required, resulting in an increase in cost. The present invention solves the problems described, and to this end, the present invention employs, as a material of the chassis, extruded members in the form of grooved steel bars or polygonal steel bars which are inexpensive, light in weight and high in strength. Such extruded members have not conventionally been applied to a chassis of a display apparatus.

Further, a conventional lighting apparatus adopts a structure wherein optical parts such as a light source like a fluorescent lamp, a light introduction plate, a reflecting plate or a diffusion plate, and other parts are accommodated in a casing in the form of a box made of a sheet metal, a synthetic resin or the like to integrate the components as a unit. If the structure is applied to a large size display apparatus of a 40-inch size or more by simply increasing the scale thereof, then the structure has a considerably high weight and this results in increase in weight of the display apparatus.

Therefore, as a first form of the present invention, a light source unit is formed from a light source and a reflecting plate, and an optical panel and a circuit board are attached independently of each other to a chassis. Since the chassis is formed as a rectangular frame having some depth, it serves also as a casing for a lighting apparatus. Accordingly, an independent box-shaped casing which forms the lighting apparatus is unnecessary, and consequently, significant reduction in weight of the set is achieved.

Further, a conventional display apparatus requires replacement of an entire lighting apparatus when a light source is deteriorated as a result of use thereof for a long time. Accordingly, where the display apparatus has a large screen, a high cost is required for such replacement. In contrast, with the display apparatus of the present invention, since only it is required to replace a necessary part, the cost for replacement can be decreased when compared with that of the conventional display apparatus. Further, in a display apparatus according to another form of the present invention, a side edge type light source unit composed of a light source, a reflecting plate, a light introduction plate and an optical panel is formed and incorporated in a chassis. Also with the display apparatus, a casing as a separate member for forming an independent lighting apparatus as in the prior art is not required. Accordingly, significant reduction in weight of the set can be achieved. Also replacement of the light source unit of the side edge type is facilitated.

Other objects and advantages of the invention will become apparent upon reading the following detailed description and appended claims, and upon reference to the accompanying drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PREFERRED EMBODIMENTS

Figure 3:
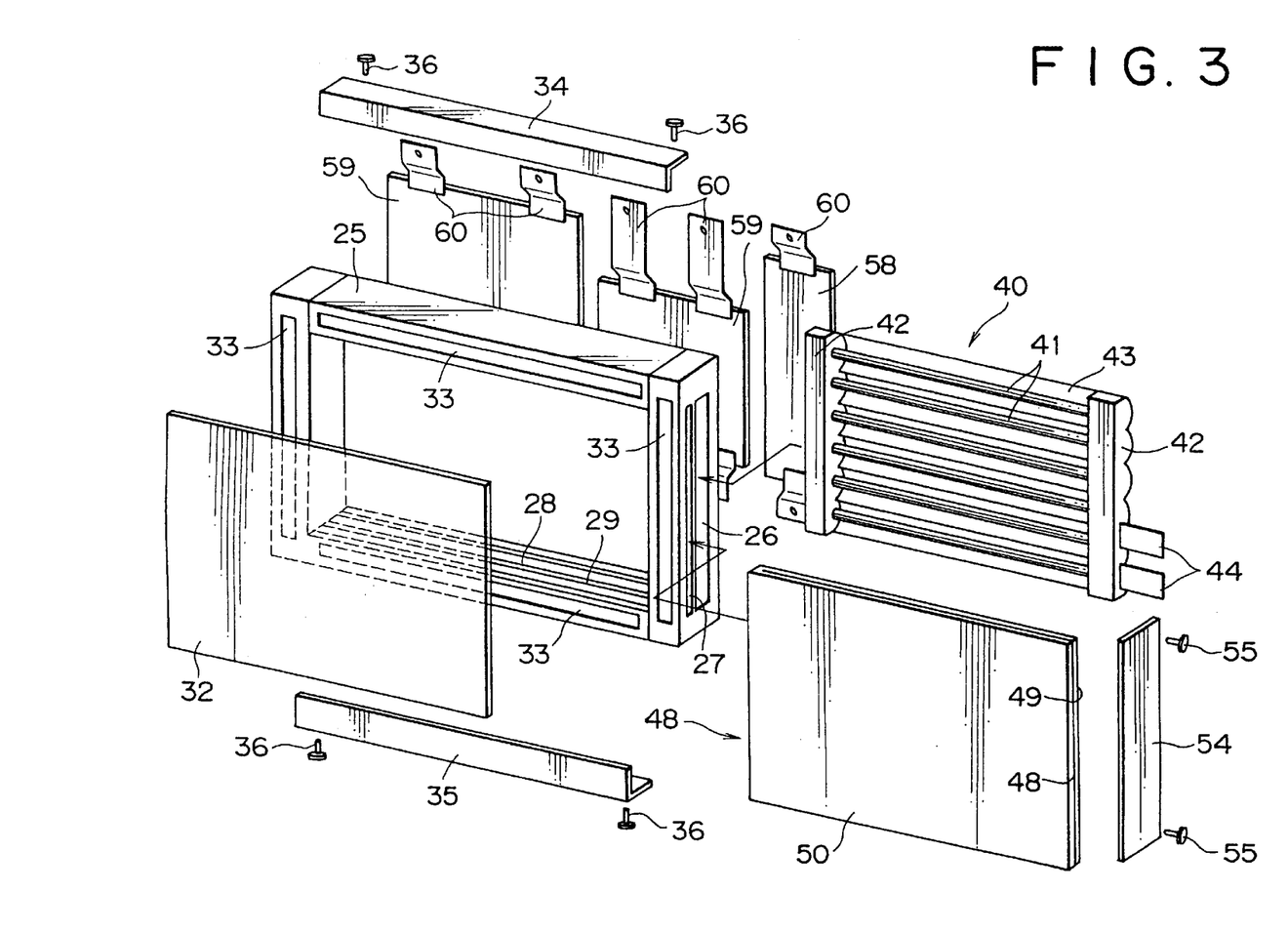
FIG. 3 is an exploded perspective view showing a display apparatus to which the present invention is applied.
Figure 4:
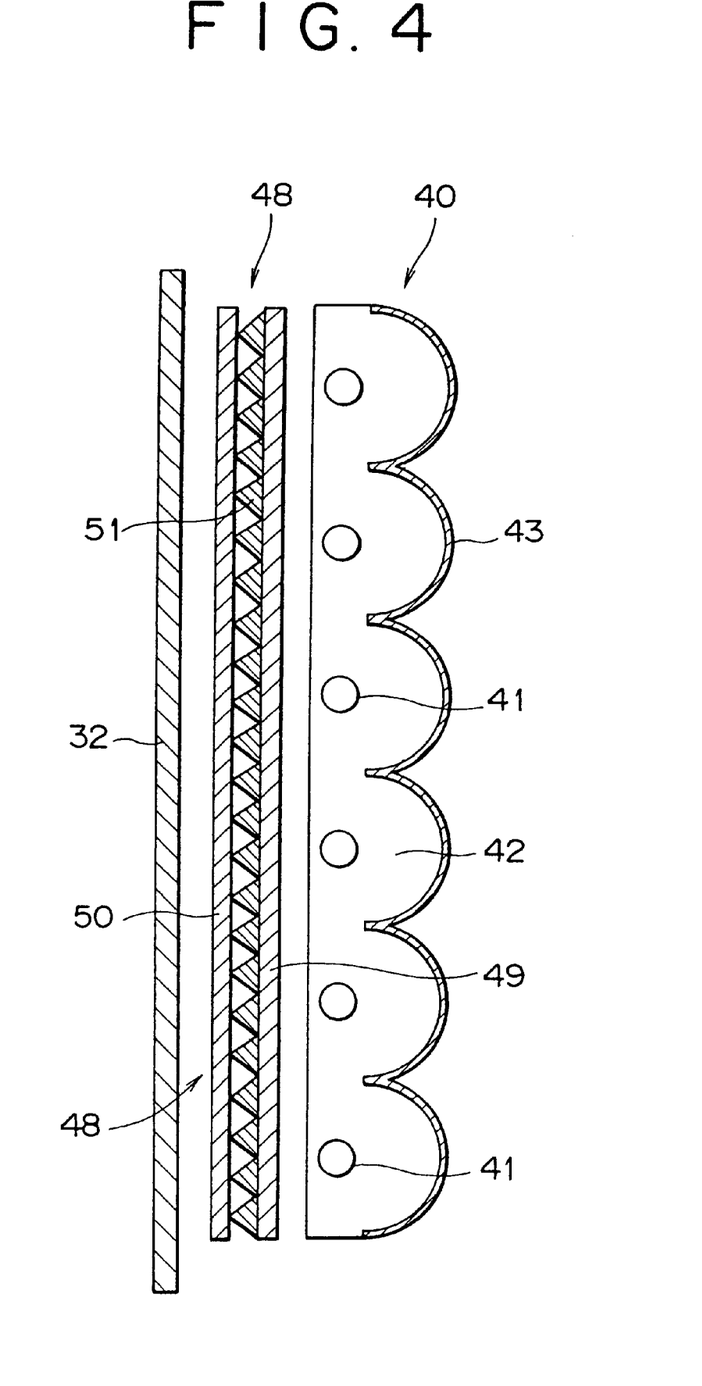
FIG. 4 is a vertical sectional view showing a structure of an optical system in the display apparatus shown in FIG. 3.

Referring to FIGS. 3 and 4, there is shown a display apparatus to which the present invention is applied. The display apparatus shown includes a frame 25. The frame 25 has a rectangular frame structure composed of a combination of four polygonal steel pipes and serves also as a chassis. Each two of the polygonal steel pipes of the frame 25 are connected to each other, for example, such that they are welded to each other or one of them has a groove or cutaway formed thereon and the other is inserted in the groove or cutaway and fastened by means of a screw. Where the connection by welding is employed, it is required that no swell by welding remain on the front face of the frame 25 to which a liquid crystal panel 32 is to be attached and care must be taken of the positional accuracy so that the frame 25 may have no torsion in a condition wherein the four steel pipes are combined. For the frame 25 which serves also as a chassis, extruded members such as polygonal steel pipes or angular grooved pipes are used in consideration of the strength, reduction in weight and the material cost.

A pair of slit-like openings 26 and 27 are formed on the right side face of the frame 25 so that a light source unit 40 and an optical panel 48 may be inserted into the frame 25 therethrough, respectively. A pair of holding grooves 28 and 29 are formed in each of the upper and lower side polygonal steel pipes of the frame 25 such that, when the light source unit 40 and the optical panel 48 are inserted through the openings 26 and 27, they are fitted into and guided by the holding grooves 28 and 29, respectively. The holding grooves 28 and 29 are required to be formed only such that they extend linearly in the direction of each steel pipe. Therefore, by arranging metal dies for extrusion of the polygonal steel tubes such that they may conform with the sectional shape of the frame, the polygonal steel tubes can be formed readily without any post-working. This is a significant merit provided by utilization of the extruded members.

The liquid crystal panel 32 is attached to the front face side of the rectangular frame 25. In particular, a double-sided adhesive tape 33 is adhered to the front face of the frame 25, and the liquid crystal panel 32 is adhered to the frame 25 with the double-sided adhesive tape 33. The liquid crystal panel 32 is fixed to the frame 25 by means of a pair of holding members 34 and 35 and a suitable number of screws 36.

On the rear face side of the frame 25, a circuit board 58 for energizing linear light sources of a light source unit 40, that is, fluorescent lamps 41, and a pair of set circuit boards 59 are attached each by means of brackets 60.

Now, the light source unit 40 for lighting the liquid crystal panel 32 from the rear face side is described. The light source unit 40 is formed as a unit wherein the plurality of fluorescent lamps 41 are disposed on a reflecting plate 43 and a pair of holding members 42 on the opposite sides of the reflecting plate 43 are screwed to the reflecting plate 43 such that they hold the opposite ends of the fluorescent lamps 41. Wiring lines from the fluorescent lamps 41 are gathered to a wiring line cable 44 such as flat cables in the holding members 42, and the wiring lines from the left side of the fluorescent lamps 41 extend along the rear face of the reflecting plate 43 to the right side and then extend outward from the right side face of the light source unit 40 together with the wiring lines from the right side of the fluorescent lamps 41. The wiring line cables 44 are connected to the circuit board 58 attached to the rear face side of the frame 25 after the light source unit 40 is inserted into the frame 25 through the slit-like opening 26 of the frame 25.

The optical panel 48 is described below. Referring to FIG. 4, the optical panel 48 includes a combination of a rear side diffusion plate 49, a prism sheet 51 and a front side diffusion plate 50. The optical panel 48 composed of the three panels is inserted into the frame 25 through the opening 27 of the frame 25. After the light source unit 40 and the optical panel 48 are inserted into the frame 25 through the openings 26 and 27, respectively, a lid plate 54 is attached to an outer surface on the right hand side face of the frame 25 and secured to the frame 25 by means of screws 55 so that the unit may not go out of the frame 25.

With the structure of the frame 25, since the frame 25 serves as a casing for the light source unit 40, holding means for the optical panel 48 and a holder for the liquid crystal panel 32, the weight of the display apparatus can be reduced significantly. Further, since the light source unit 40 can be inserted into and taken out of the frame 25 through the slit-like opening 26 on the side face of the frame 25, the fluorescent lamps 41 can be replaced very readily. Besides, since the frame 25 is so structured that extruded steel pipes are assembled by welding, a sufficient strength can be obtained.

Figure 5:
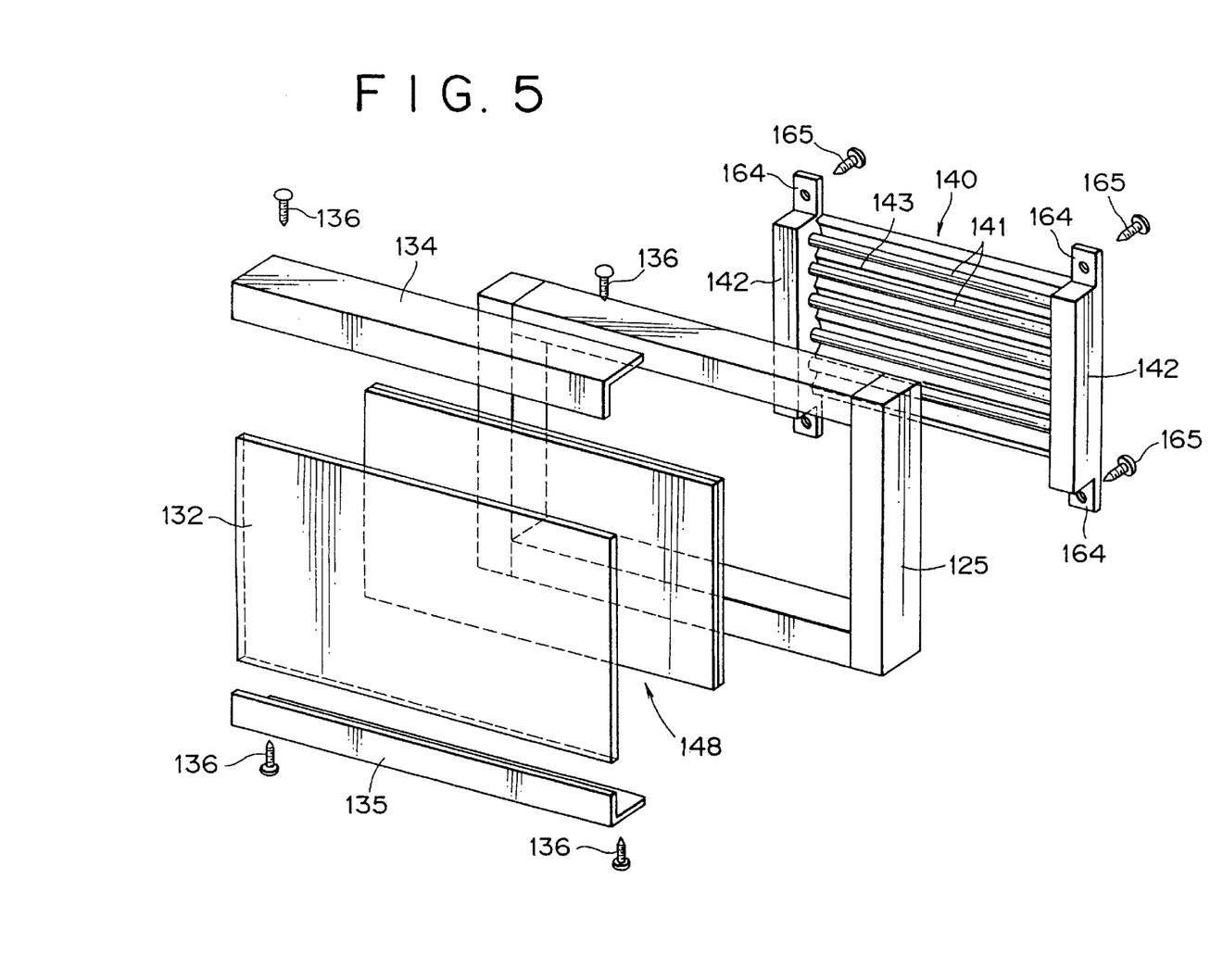
FIG. 5 is an exploded perspective view showing another display apparatus to which the present invention is applied.
Figure 6:
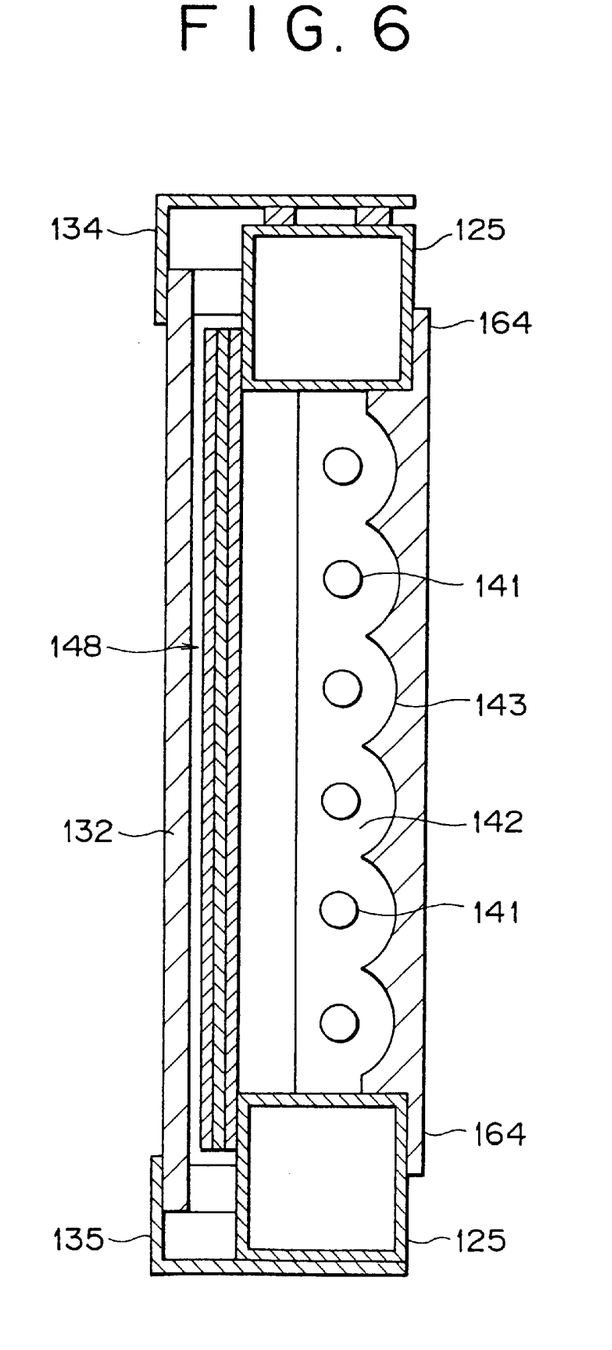
FIG. 6 is a vertical sectional view of the display apparatus shown in FIG. 5.

Referring now to FIGS. 5 and 6, there is shown another display apparatus to which the present invention is applied. The display apparatus is generally constructed such that an optical panel 148 is attached to the front face side of a frame 125 by means of fastening screws, and a display panel 132 is attached to the front face side of the optical panel 148 and held by a pair of holding members 134 and 135.

A light source unit 140 is incorporated into the frame 125 through an opening on the rear face side of the frame 125. The light source unit 140 includes a reflecting plate 143 to which a pair of holding members 142 for holding the opposite ends of fluorescent lamps 141 are coupled. A plurality of mounting tabs 164 are provided at each of upper and lower portions of the holding members 142. The light source unit 140 is introduced into the frame 125 through the rear face side opening of the frame 125 and fixed at the mounting tabs 164 thereof to the. frame 125 by means of screws 165. The optical panel 148 and the display panel 132 are attached to the front face side of the rectangular frame 125 by means of the pair of holding members 134 and 135 each having an L-shaped cross section and a plurality of screws 136. The holding members 134 and 135 are secured to the frame 125 by means of the screws 136.

With the display apparatus having the structure described above, there is no necessity to form a slit-like opening or a holding groove on the frame 125, and this simplifies the frame structure. Further, since an opening or a holding groove is not formed, the rigidity of the frame is not deteriorated. Consequently, the display panel 132, optical panel 148, light source unit 140 and so forth can be attached to the frame 125 which has a higher strength.

Figure 7:
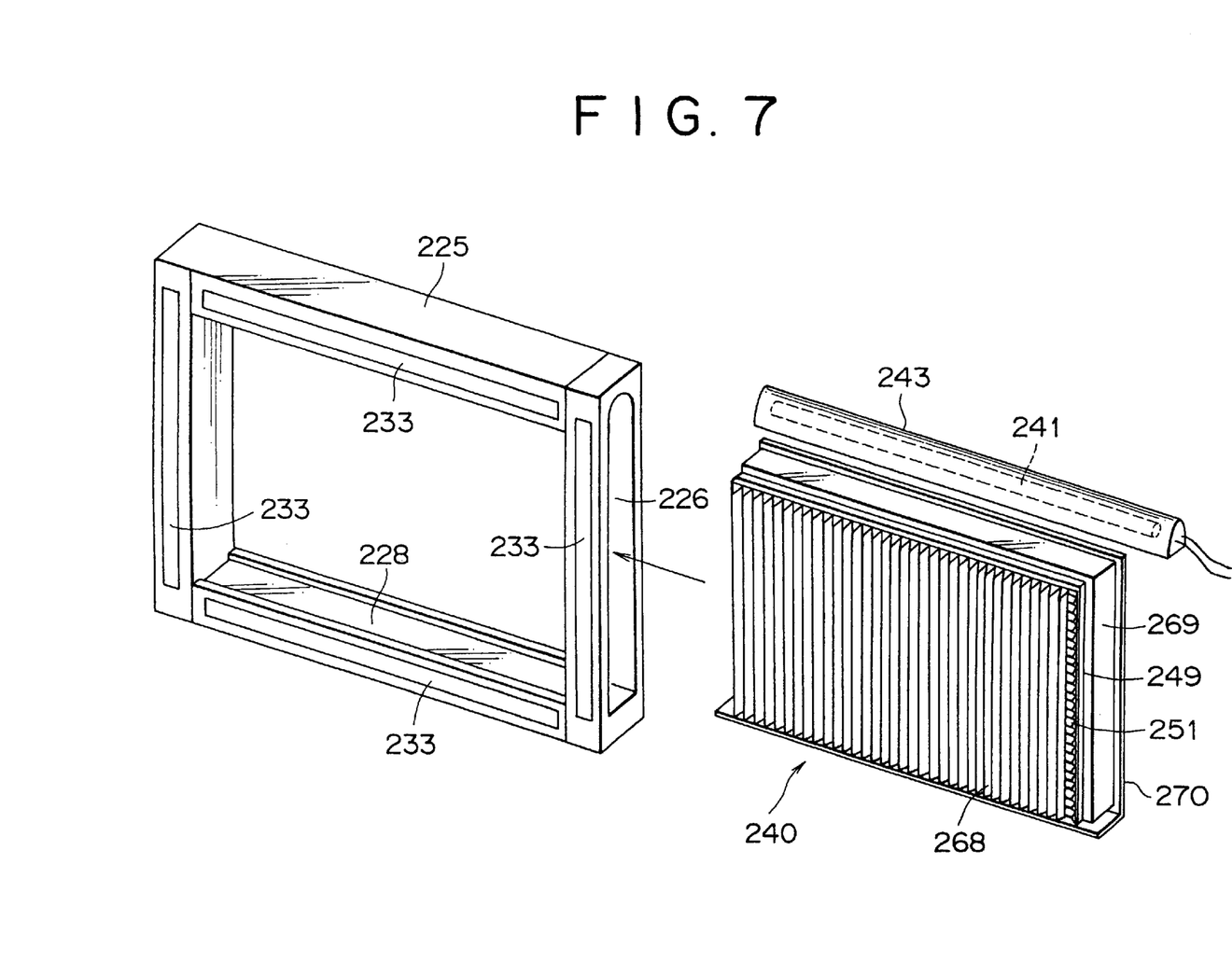
FIG. 7 is an exploded perspective view showing a further display apparatus to which the present invention is applied.
Figure 8:
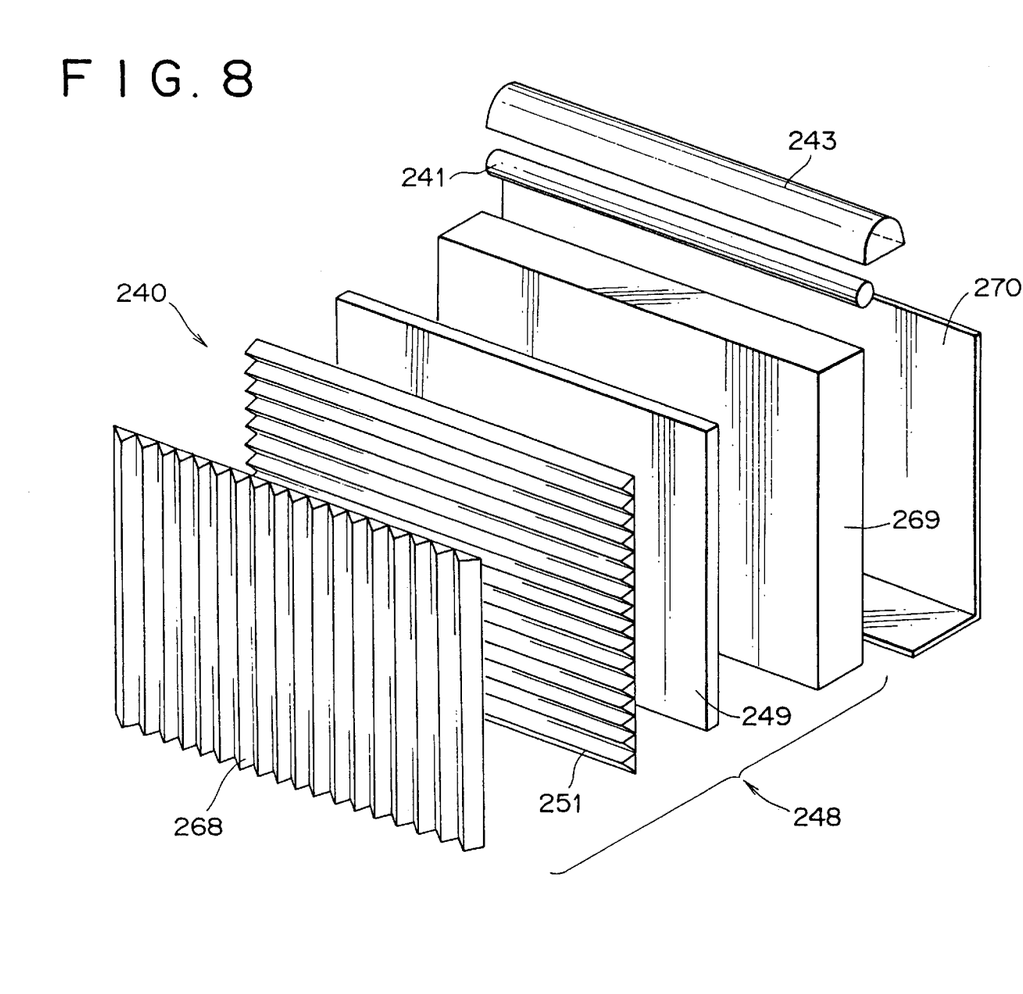
FIG. 8 is an exploded perspective view of a light source unit of the display apparatus shown in FIG. 7.

Referring now to FIGS. 7 and 8, there is shown a further display apparatus to which the present invention is applied. The display apparatus is generally constructed such that a side-edge type light source unit 240 is incorporated in a frame 225 formed from polygonal steel members produced by extrusion.

The side-edge type light source unit 240 includes, as particularly seen in FIG. 8, a fluorescent lamp 241 disposed in an opposing relationship to an upper end face of a light introduction plate 269 formed from a transparent plate of an acrylic resin. A reflecting plate 243 is disposed above the fluorescent lamp 241 while a rear face side reflecting plate 270 is disposed on the rear side of the light introduction plate 269.

Light emitted from the fluorescent lamp 241 and coming in from a side end edge of the light introduction plate 269 is introduced by an inclined face of the rear face side of the light introduction plate 269 and the rear face side reflecting plate 270 and goes out to the front side of the light introduction plate 269. A diffusion plate 249 and a pair of prism sheets 251 and 268 are disposed on the surface of the light introduction plate 269 so as to achieve reduction in non-uniformity of luminance and augmentation of the luminance on the front. The members mentioned are supported on the reflecting plate 270 to cooperatively form a unit.

The frame 225 has an opening 226 formed in the right-hand side face thereof, conforming to the shape of the cross section of the light source unit 240 so that light source unit 240 may be introduced into the frame 225 through the opening 226. A groove 228 is provided to hold the light source unit 240, and a double-sided adhesive tape 233 is provided for mounting the display panel.

As shown in FIG. 8, an optical panel 248 of the side-edge type light source unit 240 includes the upper side prism sheet 268, the lower side prism sheet 251, the diffusion plate 249, and the light introduction plate 269. The components of the optical panel 248 are combined with the fluorescent lamp 241, reflecting plate 243 and rear face side reflecting plate 270 to form a light source unit. In the side-edge type light source unit 240 having the structure just described, the reflecting plate 243 on the upper side of the fluorescent lamp 241 includes a semi-cylindrical reflecting plate 243, and the fluorescent lamp 241 is attached to the reflecting plate 243 through a holder.

Also in the side-edge type light source unit 240 of the structure described, the frame 225 serves as a casing and a holder for the light source unit 240, and it is possible to eliminate the structure where in the light source unit 240 is held by a dual structure as in the prior art, and the weight is reduced because the number of parts is reduced. Further, also upon replacement of the fluorescent lamp 241, such replacement can be performed simply by pulling out the light source unit 240 sidewardly.

Since the frame 225 has a structure formed from a combination of extruded members such as polygonal steel pipes, the cost of the frame 225 is decreased when compared with an alternative frame formed by bending a sheet metal in a complicated shape as in the prior art, and also where the frame 225 is applied to a display panel 232 which is a large size of 40 inches or more, since the polygonal steel bars or polygonal steel pipes themselves are light in weight and form a strong frame, the frame 225 exhibits a sufficient strength although the weight thereof is light. Accordingly, the structure described above provides a display apparatus which allows simple replacement of a light source, is simple in structure and small in number of parts and besides is light in weight and high in strength.

While preferred embodiments of the present invention have been described using specific terms, such description is for illustrative purposes only, and it is to be understood that changes and variations may be made without departing from the spirit or scope of the following claims.

What is claimed is:

1. A display apparatus including a rectangular display panel having a front side for displaying an image thereon, a rear side and four side edges, the display apparatus comprising:
   a rectangular frame formed from a combination of bar members corresponding to four side edges of the display panel;
   a circuit board mounted on the frame together with the display panel; and
   a liquid crystal panel mounted on an exterior of the frame in front of the display panel, wherein
   at least one of said combination of bar members comprises a guide groove and at least one of said bar members comprises an opening, wherein said display panel is inserted into said frame through said opening in one of said bar members, and is held in place by said guide groove in said at least one bar member.

2. The display apparatus of claim 1 wherein each of the bar members which form the frame comprises a polygonal tube-like member, the polygonal tube-like member of at least one of said bar members has a groove for holding a part or a unit of said display apparatus.

3. The display apparatus of claim 2 wherein the at least one bar member is formed from a molded member, and the groove is formed in the molding direction.

4. The display apparatus of claim 1 wherein the frame supports a light source unit of the display panel and serves also as a casing for the light source unit.

5. The display apparatus of claim 1 wherein the light source unit includes a plurality of linear light sources mounted on a reflecting plate and the light source unit is removably mounted on the frame.

6. The display apparatus of claim 1, further comprising a liquid crystal panel attached to said frame by double-sided adhesive tape.

7. The display apparatus of claim 1, further comprising a liquid crystal panel attached to said frame by a plurality of holding members.

8. The display apparatus of claim 1, wherein said display panel comprises two diffusion plates and a prizm sheet sandwiched therebetween.

9. A display apparatus comprising:
- a rectangular frame comprising a front face side and four edge sides;
- a display panel attached to the front face side of said frame;
- a light source unit including a light source disposed in front of and coupled to a reflecting plate, the light source further comprising an optical panel disposed in front of the light source, the light source unit being accommodated in and held by the frame; and
- a liquid crystal panel attached to said front face side of said frame on an exterior of said frame, wherein
  - at least one of said four edge sides comprise two guide grooves and at least one of said four edge sides comprises a plurality of openings, wherein
  - said display panel is inserted into said frame through one opening of said plurality of openings in said at least one of said four edge sides, and is held in place by one guide groove of said two guide grooves, and wherein
  - said light source unit is inserted into said frame through another opening of said plurality of openings in said at least one of said four edge sides, and is held in place by another guide groove of said two guide grooves.

10. The display apparatus of claim 9 wherein the light source unit is inserted into the frame through an opening of the frame and is held in place by grooves disposed on an inner side of said frame.

11. The display apparatus of claim 9 wherein the light source unit is inserted into the frame through an opening on a rear face side of the frame.

12. The display apparatus of claim 9, wherein said liquid crystal panel is attached to said front face of said frame by double-sided adhesive tape.

13. The display apparatus of claim 9, wherein said liquid crystal panel is attached to said front face of said frame by a plurality of holding members.

14. The display apparatus of claim 9, wherein said display panel comprises two diffusion plates and a prizm sheet sandwiched therebetween.

* * * * *